E. A. KUEN.
FASTENING DEVICE FOR AUTOMOBILE LAMP CLOSURES.
APPLICATION FILED APR. 7, 1919.
1,334,762.        Patented Mar. 23, 1920.
2 SHEETS—SHEET 1.
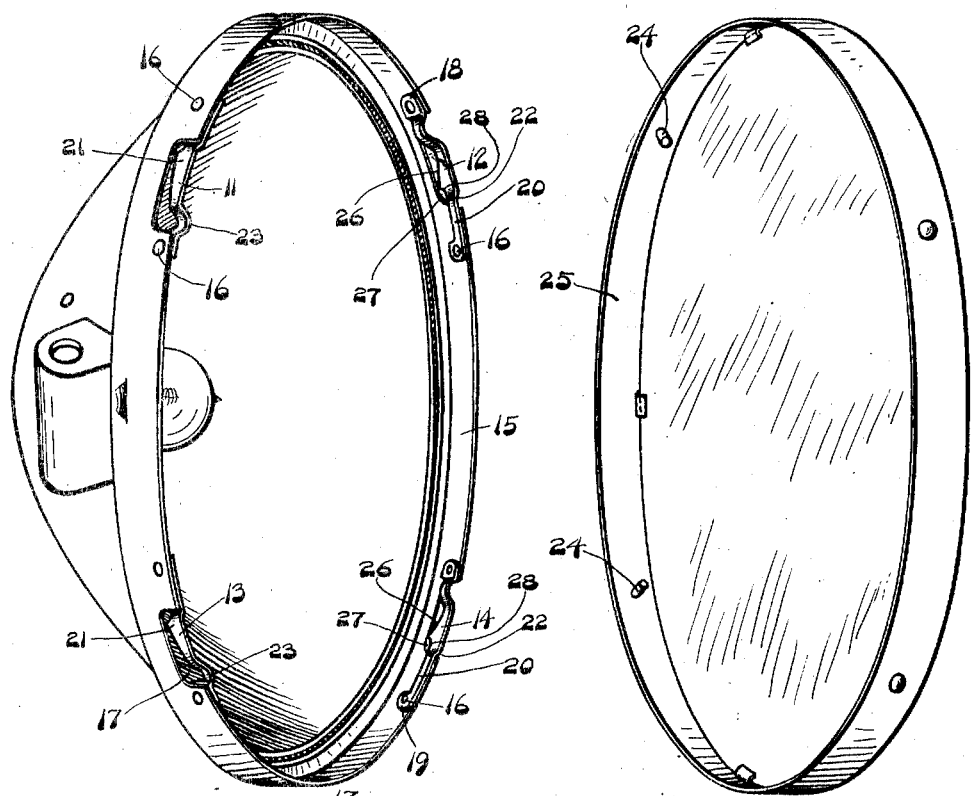
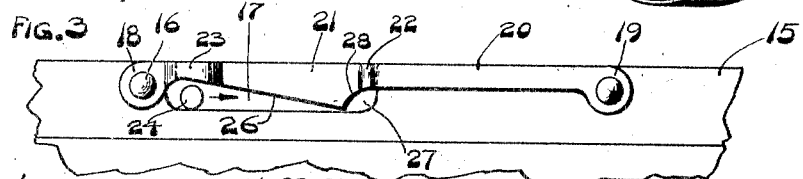
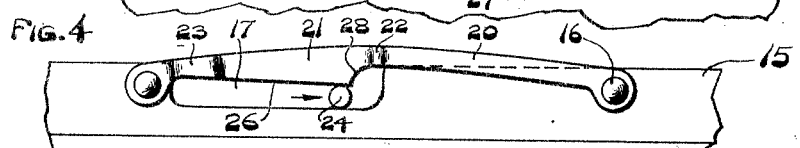
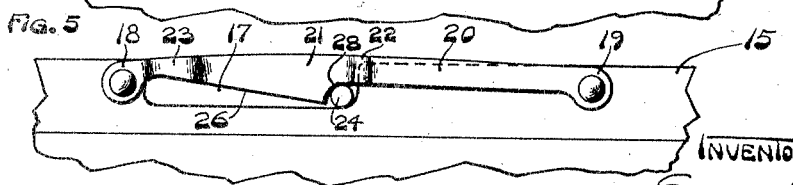
INVENTOR
Eugene A. Kuen
BY
W. Thornton Bogert
ATTORNEY

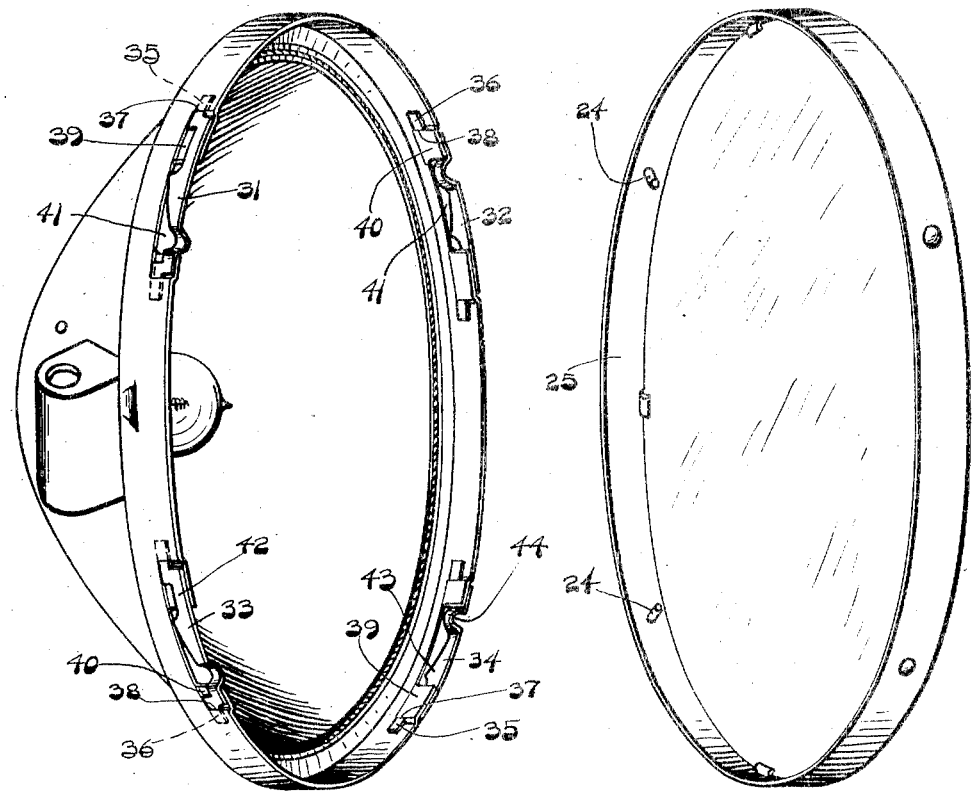

UNITED STATES PATENT OFFICE.

EUGENE A. KUEN, OF CINCINNATI, OHIO.

EUGENE A. KUEN, OF CINCINNATI, OHIO, ASSIGNOR TO THE THOS. J. CORCORAN LAMP-CO., OF CINCINNATI, OHIO, A CORPORATION OF OHIO.

1,334,762.      Specification of Letters Patent.     Patented Mar. 23, 1920.

Application filed April 7, 1919. Serial No. 288,132.

*To all whom it may concern:*

Be it known that I, EUGENE A. KUEN, a citizen of the United States, residing at Cincinnati, in the county of Hamilton and State of Ohio, have invented a new and useful Fastening Device for Automobile-Lamp Closures, of which the following is a specification.

An object of my invention is to produce an improved fastening device for the closures of automobile lamps, in which the closure is held with greater freedom from vibration with respect to the body of the lamp.

A further object is to produce an improved closure fastening device for automobile lamps, in which accidental displacement or loosening of the closure from fastened position is rendered impossible.

These and other objects are attained in the closure fastening device described in the following specification and illustrated in the accompanying drawings in which:—

Figure 1 is a perspective view of a lamp body having fastening device elements embodying my invention attached thereto.

Fig. 2 is a perspective view of a closure having other fastening device elements adapted to coöperate with those disclosed in Fig. 1.

Figs. 3, 4 and 5 are fragmental elevational views of my improved closure fastener, showing the different positions taken by the elements thereof during the fastening operation.

Figs. 6 and 7 disclose a modified form of fastener embodying my invention.

Figs. 8, 9 and 10 are views showing the elements of a modified form of my invention, in the different positions they assume during the locking operation.

The form of my invention disclosed in Figs. 1 to 5 inclusive, consists of a series of springs 11, 12, 13 and 14 secured to the annular rim 15 of the lamp body by means of rivets 16, notches 17 being cut in the rim 15 between the rivets for purposes to be now described. Each spring consists of a strip of spring metal having eyelets 18 and 19 at the ends for the passage of rivets therethrough, a long narrow spring portion 20 and a shorter inclined portion 21 being located between the eyelets. The inclined portion 21 of each spring is located within its coöperating notch 17 by providing an offset 22 in portion 20 of the spring at one end of the inclined portion 21, an inwardly curved offset 23 being provided at the opposite end of inclined portion 21 for permitting the unimpeded passage of the proper one of a series of pins 24 extending inwardly from the annular rim 25 of the closure shown in Fig. 2.

The lower edge 26 of the portion 21 of the spring is inclined as shown clearly in Fig. 3, so that as the pin 24 is moved in the direction of the arrow by rotating the closure after it has been brought to the position in which its pins are located as shown in Fig. 3, each pin will be brought into engagement with the inclined surface 26 and will force the spring to the condition shown in Fig. 4. Continued rotation of the closure will bring the pin beyond the inclined surface 26 and will permit the spring to draw back to substantially normal condition by permitting the pin to occupy a space 27 between the end of the notch 17 and a curved shoulder 28 on the spring. However it will be seen that the width of space 27 is not as great as the diameter of the pin 24 and that therefore the spring remains in a slightly flexed condition after the pin has been moved to the closure locking position just described, thus preventing vibration of the closure.

Another feature of the invention lies in the expansive tightening action of the springs to hold the closure in position upon the annular rim of the lamp body simultaneously with the drawing of the closure toward the body in the fastening operation. This is accomplished because of the peculiar movement of the spring at its pin-engaging portions, outwardly, thus tending to take up looseness between the body and closure when the pins 24 hold them in the position shown in Fig. 5. By the expansive tightening action of the spring I refer to the motion of the spring during flexure. This motion, because of the curvature of the spring in conformation to the curvature of the body and because the spring is held at its ends, causes the inner edge of the spring along the projection-engaging portion thereof, to move slightly radially with relation to the periphery of the body. Such an action therefore causes the spring to move toward the inner wall of the rim of the closure and to be held in this position when the closure is placed in position and rotated with relation to the body to bring it to locked position.

In the form of my invention which I have just described, it is advantageous to place the springs within the annular rim of the body because the exterior wall of the rim is thereby uninterrupted by protrusions which would interfere with the nicety of fit of the closure thereon. For this same reason the springs disclosed in the modified forms of my invention disclosed in Figs. 6 to 10 inclusive, are so positioned and secured that there are no protrusions beyond the surface of the annular flange of the body.

In the forms of the invention disclosed in Figs. 6 to 10 inclusive, the ends of the springs 31, 32, 33 and 34 are secured by having the extending tongues 35 and 36 at the ends thereof passed through openings 37 and 38 in the annular rim of the body at the ends of depressed spring-receiving portions 39 and 40 between which, either notches 41 as shown in Figs. 6 and 7 or more deeply depressed portions 41ª as shown in Figs. 8 to 10 inclusive, and corresponding to notches 17 of the previously described construction, are located. The springs of the modified construction just described are in all respects like those of the previously described construction except for the formation of the extending tongues 35 and 36, long narrow spring portions 42 and shorter inclined portions 43 which correspond to portions 20 and 21 of the previously described construction, being provided with inwardly curved offsets 44 corresponding to offsets 23 of the previously described construction.

The operation of the modified construction is like that of the previously described construction and is clearly shown in Figs. 8 to 10 inclusive, these views being taken looking at the rim from the outside, the views shown in Figs 3 to 5 being taken looking at the rim from the inside.

In the constructions just described the removal of the lamp closure is readilly effected by giving it a reverse but quick and positive rotation to that taken in fastening it on the body. This frees the pins 24 from the locking notches of either form of springs and enables the closure to be removed easily.

Having thus described my invention what I claim is:

1. In a lamp comprising a body and a closure, a spring fastener between the body and the closure, secured to the body and having yielding motion in the plane of the width of the fastener, a projection on the closure extending inwardly and radially therefrom for coöperation with the fastener, said fastener having an inclined inner edge arranged for engagement of the projection therewith for causing the fastener automatically to recede upon rotative movement of the closure with relation to the body, the inclined edge terminating in a notch adapted to receive the projection and having an inclined portion, whereby the closure will be held with constant pressure toward the body, and adapted to prevent inadvertent return movement of the closure upon completion of the rotative fastening movement.

2. An automobile lamp comprising a body, a closure, and a closure fastening device consisting of a spring held at its ends and having means between its ends to cause increased pressure of the closure toward the body upon rotation of the closure within fixed limits with relation to the body, said spring having means to retain the closure in fastened position at an increased pressure position of its movement, and to permit release and removal of the closure upon forcible reverse rotation thereof.

3. In a lamp, the combination of a body and a closure, the body having a plurality of spaces in its periphery, the closure having a plurality of projections registering with the spaces, and a series of springs extending across the spaces with their ends secured at the ends thereof, each spring having an inclined projection-engaging edge and a notch at the end of the greatest elevation of the inclined projection engaging edge, whereby the closure will be retained in fastened position, or may be released therefrom upon forced reverse rotation.

4. In a lamp, the combination of a body having a closure receiving rim, a closure adapted to occupy the closure receiving rim of the body, a spring held at its ends upon the closure receiving rim and conforming to the curvature thereof, and a projection upon the closure adapted to engage the inner edge of the spring, the projection engaging edge of the spring being inclined to cause flexure of the spring upon rotation of the closure with relation to the body, whereby the spring will draw the closure toward the body and move radially thereof toward the closure.

5. In a lamp, the combination of a body, a closure comprising a ring member, said body and ring member constituting a pair of elements comprising justaposed annular walls, leaf springs separate from said annular walls, means for securing the ends of said respective leaf springs to the annular wall of the body, with said leaf springs extending edgewise substantially concentric with said annular walls, said respective leaf springs being provided with inclined contact edges between the ends thereof, the annular wall of the ring member being provided with contact parts coacting with said respective inclined contact edges and constructed and arranged whereby to flex said respective springs substantially in the directions of the cylindrical projections of said annular walls and radially thereto.

6. In a lamp, the combination of a body having a circular rim, a closure comprising a ring member, interengaging means between said body and said closure comprising leaf springs and contact parts, said leaf springs being arranged substantially concentrically with the rim of the body and closure and the widths of the springs extending in directions parallel with the axis of the body and closure, the contact parts coacting with said springs to flex the latter in directions substantially parallel with their planes.

EUGENE A. KUEN.